United States Patent
Borrel et al.

(10) Patent No.: US 8,487,749 B2
(45) Date of Patent: Jul. 16, 2013

(54) TACTILE VIRTUAL WORLD

(75) Inventors: Paul Borrel, Cortlandt Manor, NY (US); Bernice E. Rogowitz, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 12/432,284

(22) Filed: Apr. 29, 2009

(65) Prior Publication Data

US 2010/0277469 A1 Nov. 4, 2010

(51) Int. Cl.
*H04B 3/36* (2006.01)

(52) U.S. Cl.
USPC .......... 340/407.1; 345/633; 345/173

(58) Field of Classification Search
USPC .............. 345/633, 173; 340/407.1
See application file for complete search history.

(56) References Cited

U.S. PATENT DOCUMENTS

| 7,009,595 | B2 | 3/2006 | Roberts et al. | |
|---|---|---|---|---|
| 2001/0041326 | A1* | 11/2001 | Zeier | 434/33 |
| 2009/0231272 | A1* | 9/2009 | Rogowitz et al. | 345/156 |
| 2009/0231287 | A1* | 9/2009 | Rogowitz et al. | 345/173 |

OTHER PUBLICATIONS

John Underkoffler et al.; "Emancipated Pixels: Real-World Graphics in the Luminuous Room"; Tangible Media Group, MIT Laboratory; pp. 385-392.*
John Underkoffler et al. "Emancipated Pixels: Real-World Graphics in the Luminuous Room"; 1999, SIGGRAPH 99 Conference Proceedings, pp. 385-392.*
Yang, et al., "Quantitative Tactile Display Device with Pin-Array Type Tactile Feedback and Thermal Feedback"; May 19, 2006.
Iwata, et al., "Project Feelex: Adding Haptic Surface to Graphics"; Aug. 17, 2001.
VRlab, "Feelex", pp. 1-3; 2008.
Dan Overholt, "The MATRIX: A Novel Controller for Musical Expression"; and 2001.
Wagner, et al., "A Tactile Shape Display Using RC Servomotors", Harvard BioRobotics, pp. 1-8, Mar. 24, 2002.

* cited by examiner

*Primary Examiner* — Said Broome
*Assistant Examiner* — Peter Hoang
(74) *Attorney, Agent, or Firm* — Scully, Scott, Murphy & Presser, P.C.; Louis J. Percello, Esq.

(57) ABSTRACT

A system for providing a tactile virtual world or environment wherein, in particular, a virtual reality environment provides an interactive 3-D interface for synthesizing the feeling of experiencing a 3-D environment. The invention also provides a method for implementing actual physical applications that can simulate real 3-D environments; for example, such as a physical training exercise or artificial 3-D environments, or simulating the interacting with molecules or complex data sets.

14 Claims, 3 Drawing Sheets

TACTILE VIRTUAL WORLD

BACKGROUND OF THE INVENTION

1. Field of the Invention

The present application relates to the provision of a tactile virtual world or environment wherein, in particular, a virtual reality environment provides an interactive 3-D interface for synthesizing the feeling of experiencing a 3-D environment. More particularly, there is provided a method for implementing actual physical applications that can simulate real 3-D environments; for example, such as a physical training exercise or artificial 3-D environments, or simulating the interacting with molecules or complex data sets.

2. Background Art

In the current state-of-the-technology, which is concerned with the formation of virtual reality environments, a significant limitation which is encountered with regard to the so-called computer graphics environments resides in that these produce only relatively primitive or crude methods for the feeling, touching or shaping of the surfaces and textures of the virtual world or environment.

Presently, products that are available in the state of the technology in this particular area of interest, necessitate the use of data gloves, such as gloves which sense hand positions and/or which provide extremely low special resolution vibrations; and require haptic probes, such as are commercially available from known entities, such as SensAble and Haption (registered trademarks), the latter of which employ force-feedback in order to indicate the properties of an object in a point by point aspect.

More recently, copending United States patent applications have been filed by the present inventors, which each provide for a methodology wherein devices comprising arrays of essentially displaceable pins denote surfaces and their respective properties. These devices, in one instance, are disclosed in U.S. patent application Ser. No. 12/047,771, entitled "Novel Tactile Input/Output Device and System to Represent and Manipulate Computer-Generated Surfaces", which provides for a device and method wherein the hand of a user is placed on an array of pins, thereby facilitating the user to feel and edit any arbitrary computer-generated surface. A co-pending U.S. patent application Ser. No. 12/047,848, entitled "Virtual Hand: A New 3-D Haptic Interface for Virtual Environments", discloses the mounting of an array of pins on a robot arm for enabling a user to move a "Virtual Hand" through a virtual world, in order to touch, feel and edit its surfaces. Both of these copending U.S. patent applications are commonly assigned to the assignee of the present application and the disclosures of which are incorporated herein by reference in their entireties.

Firstly, although these approaches, which are clearly elucidated in the above-mentioned patent applications, are novel and quite useful, they are to some extent limited in that the user must wear a physical device. Secondly, when using the physical devices, the user thereof can only "feel" the virtual world through his/her palms. Thirdly, although the sensation of touch or "feel" is communicated by the displacements of the applicable pins in the array, it does not produce the same sensation as would be the touching of a physical object with bare hands. Fourthly, the spatial sensitivity of the hands is significantly more refined than the resolution of the array of pins, whereas in the technology currently available, the movements of the object represented by the virtual reality environment cannot be felt on the user, except through haptic device worn by the user. Moreover, since the virtual world is basically fixed, the user is not able to move beyond its spatial limits.

SUMMARY OF THE INVENTION

In order to further improve upon the foregoing state-of-the-art and broaden the aspects of being able to derive tactical virtual worlds or environments, the present invention manages to move the interface directly to a virtual room, whereby instead of having pins move up and down on a device on which the hand of a user is resting, the walls of the room are constructed with pins which are adapted to move in and out in order to represent the spatial positioning of objects in the virtual world. As in above-mentioned the previous two patent applications, the user can sense and edit all the surfaces in the world, but now is free to touch the world with one or both hands, face, or leg. The inventive structure can either be mounted along a wall of a room, or, in a preferred embodiment, can be attached to a cylinder surrounding the user, thereby providing degrees of virtual touch. Moreover, the cylinder can be moved on a gantry in coordination with the movements of the user, thereby increasing the size of the virtual world to as far as the gantry can travel. When the user wears a device that presents visual information about the virtual world, the user can have an experience of the virtual world, which was heretofore unachievable, whereby in this world, the user can see, feel, touch and edit body-sized objects, for instance, such as items of furniture or avatars, which can be moved. Moreover, the actions of the object represented by the virtual reality environment can be directly felt by the user, such as a virtual physical therapist.

In essence, pursuant to the invention, the user interacts with a wall or with an enclosing cylinder, which is equipped with a two-dimensional array of pins. Visual aspects of the virtual computer-generated world are communicated to the user through standard virtual reality goggles. The user can physically touch the pins, thereby imparting the illusion that he/she is touching the virtual objects, and in which the user can push on the pins so as to feel and edit the surface of the virtual objects, in a manner as described in copending U.S. patent application Ser. No. 12/047,771. The pins can move in and out from the wall or cylinder interior in order to reflect the positions, textures, movements and other physical characteristics of the objects in the virtual world. A chamber deforming the cylinder is mounted on a movable gantry that is adapted to move as the user moves.

Thus, pursuant to the present invention, there are significant distinctions in comparison with the hereinabove mentioned U.S. patent applications, in a considerable aspects, as follows:

This system is differentiated from prior art in that:
1. The whole body can touch, edit and interact with the virtual world.
2. The virtual objects shapes and positions are defined by the pins, whereby the user can touch, feel and interact with the virtual objects directly as if they were real objects. This is different from the virtual hand concept of U.S. patent application Ser. No. 12/047,848, in which the user's experience of scanning a hand across an object was provided through a moving set of pins on his palm, whereby in this case, the pins are stationary (unless the user moves them) and the user can move his/her hand across the surface to feel the shape and texture thereof.
3. The user does not have to wear any device on his/her hand.

4. The above can conceivably provide a mechanism for Avatars in virtual worlds that move, sense, touch, and can be touched.

5. The movement of the pins can be slaved to a motion-capture mechanism, such that the movements, which have been captured in an external environment, can be played out on the surface of the pins, providing a dynamically moving representation, for example, of a dancer, whereby a scene displayed in a head-mounted display on the user can be a video of that dancer represented in his/her original environment. This scenario could conceivably be employed for remote wrestling, remote training, remote physical therapy, and remote social interaction. Additionally, this mechanism could also be employed to provide a living memorial of someone who is deceased, while moreover, that representation could be produced by adding the face of the loved one onto a body movement of an actor or of something which has been recorded. This would enable someone to reach out and touch their loved one and have them reach out and touch them back in a virtual environment.

Although the foregoing aspects clearly provide advantages and distinctions, it is also possible to contemplate alternative embodiments which still further distinguish over the above-referenced copending U.S. patent applications.

For example, the pins may extend upwardly from the floor, which would be very useful for representing objects such as furniture. Also contemplated could be an array of pins extending from a table, or such as a mannequin employed for CPR training that possesses a "real" heartbeat, body motion, and so forth. This would also be suitable where the intent is to be able to reach behind objects in the virtual space, which would not be possible in the structured mode where pins extend laterally from the sidewall. Another embodiment would be a flat wall, which could be used in order to represent artistic objects in gas relief. Whereby, in such an application, users could touch a realistic representation of delicate antiquities without potentially harming or ruining them.

Accordingly, it is an object of the present invention to provide novel arrangement for providing a haptic virtual world or environment through an interactive 3-D interface.

Another object of the present invention resides in the provision of a unique method of providing a haptic virtual world or environment utilizing the novel arrangement as described herein.

BRIEF DESCRIPTION OF THE DRAWINGS

Reference may now be made to the following detailed description of the invention taken in conjunction with the accompanying drawings; in which.

DETAILED DESCRIPTION OF THE INVENTION

Figure 1:
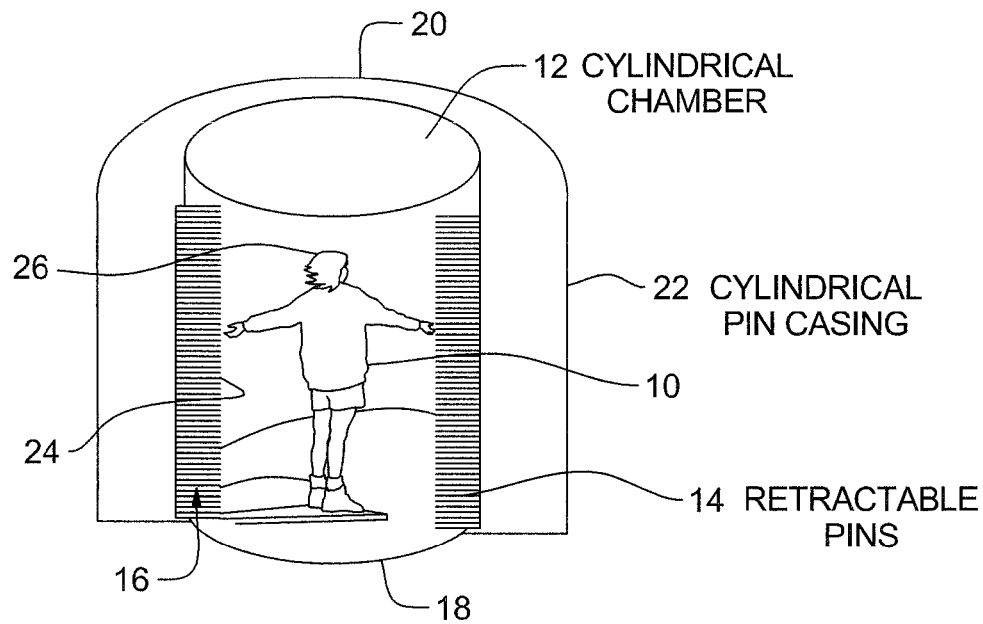
FIG. 1 illustrates a generally schematic representation of a structure for the provision of a haptic virtual world.

Referring now in detail to the drawings, FIG. 1 represents a schematic view of a Haptic Virtual World, pursuant to the invention. In essence, a user 10 enters into a cylindrical chamber 12, which is of a height and diameter able to fully receive and contain the user, and wherein the peripheral sidewall 14 thereof is lined with a cylindrical array of pins 16, with the array extending from the floor 18 to the ceiling 20 of the cylindrical chamber 12. These pins 16 are essentially retractable in nature and extend radially inwardly in an orientation normal to the cylindrical wall surface 14 of the chamber 12, which is surrounded by a cylindrical casing 22. These pins 16 are driven by actuators (not shown), which operate in response to the movement of a rack and pinion mechanism, such as described in the above-mentioned co-pending U.S. patent applications. Moreover, any other suitable driving system, such as hydraulic actuators, can also be employed in that connection for driving the pins 16.

When the pins 16 are fully extracted from the wall 14, in effect, radially inwardly extended from the cylindrical wall of the chamber, they form a cylindrical surface 24 extending about the user 10 who is shown standing inside the chamber 12. Different configured surfaces and textures are created by adjusting the extension of respective of the pins 16 in radially inward extensions. Hereby, the radial arrangements of the pins 16 enable a computer program to create a virtual world, which is matched to the user's viewpoint and perspective, while located within the cylinder 12. Although not illustrated in the drawings, the user, when standing or located in the cylindrical chamber 12, can be equipped with a head-mounted display 26, which provides for a computer graphic representation of the virtual world, within which the user 10 is viewing and touching.

Pursuant to an alternate embodiment, not disclosed herein, the head-mounted display may represent a video of an object environment, as represented by the pins 16, while pursuant to a further embodiment, the user 10 is not wearing a head-mounted display, but only uses or touches the surfaces which are created by the pins. The present invention may also provide for a multi-resolution environment within the context of the foregoing concept.

Because the cylinder 12 is circular, having all of the pins 16 extend fully would result either in very low spatial resolution for objects far from the user, or result in overlapping and crossing pins. In order to achieve a roughly similar spacing between pin tips at any distance from the user, the pins 16 are organized in multiple layers. Pins of different lengths are interdigitated so that only a fraction of the pins extend the full distance, whereas other pins extend only partly. As illustrated on FIG. 2, several rings of pins 16, centered on the user 10, each at a different maximum extension into the cylinder 12, provide a multi-resolution mechanism that provides approximately the same resolution while avoiding overlapping and crossing pins. In this set-up, the number of pins 16 per ring doubles from one ring to the next so as to provide additional pins to maintain resolution as we move away from the center of the cylinder. The number of rings, the number of pins per rings, and the radii of the rings, r, is discussed hereinbelow.

Figure 2:
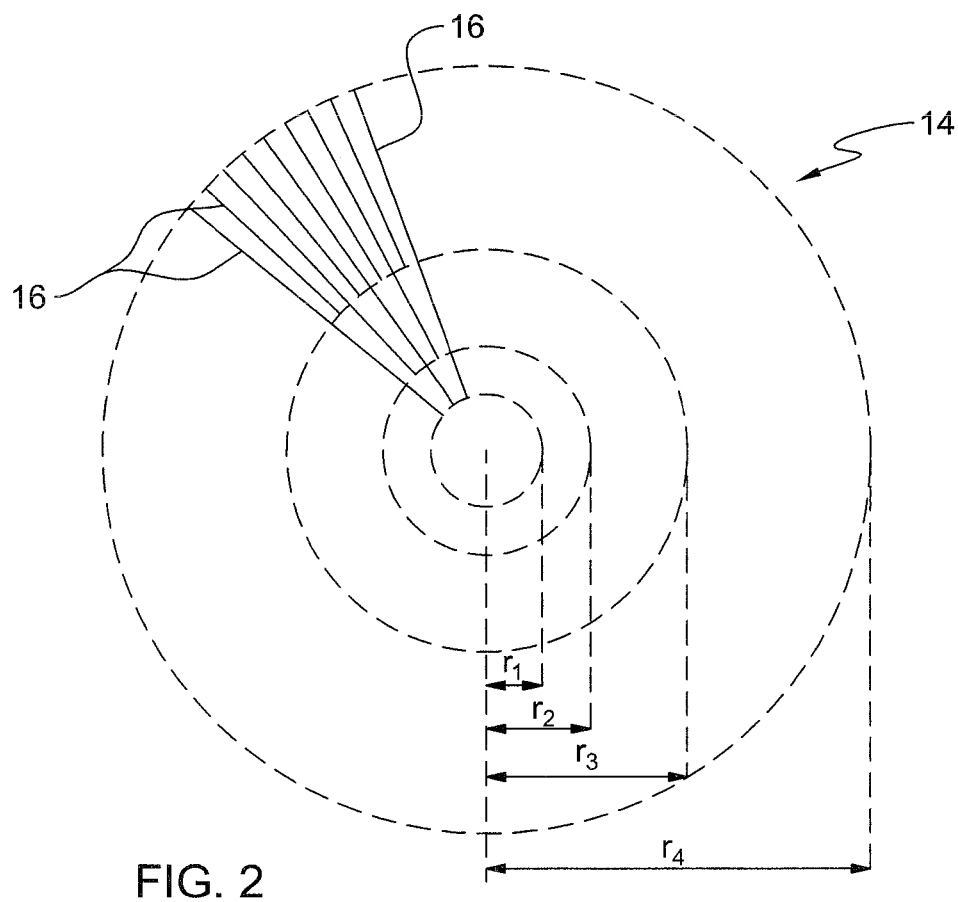
FIG. 2 illustrates a diagrammatic cross-section, on an enlarged scale, of the structure of FIG. 1.

As shown in FIG. 2 of the drawings, representing a cross-section of the cylinder showing the extension of the pins into the chamber and the cascading system of interdigitated pins. Hereby, in FIG. 2, four rings of pins 16, at radii r1, r2, r3 and r4, provide the multi-resolution environment.

Width and Spacing of the Pins

Let w be the width of a pin 16.

Let d be the maximum distance between the center of two adjacent pins. The value of d defines the resolution at which the users will feel the virtual world.

Figure 3:
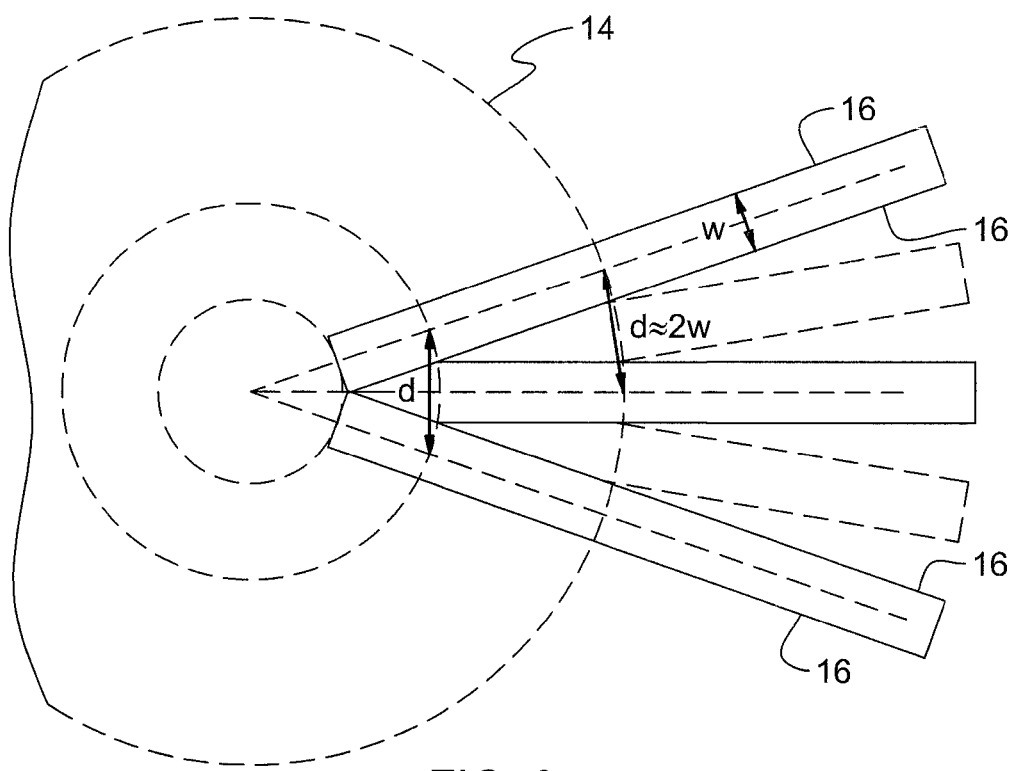
FIG. 3 illustrates, similar to FIG. 2, diagrammatically a relationship between resolution and width of pins utilized in the haptic virtual world.

As illustrated in FIG. 3, in order to maintain a resolution that is equal to or better than d at any distance from the user

10, the distance between the center of two adjacent pins (i.e., d) at ring i must be such that there is enough room to have an additional pin between them at ring i+1. This distance can be approximated by 2×w. Therefore, d is greater or equal to 2×w, and for optimal resolution:

$$d = 2 \times w \quad (1)$$

Determining the relationship among the radii of the rings.

Figure 4:
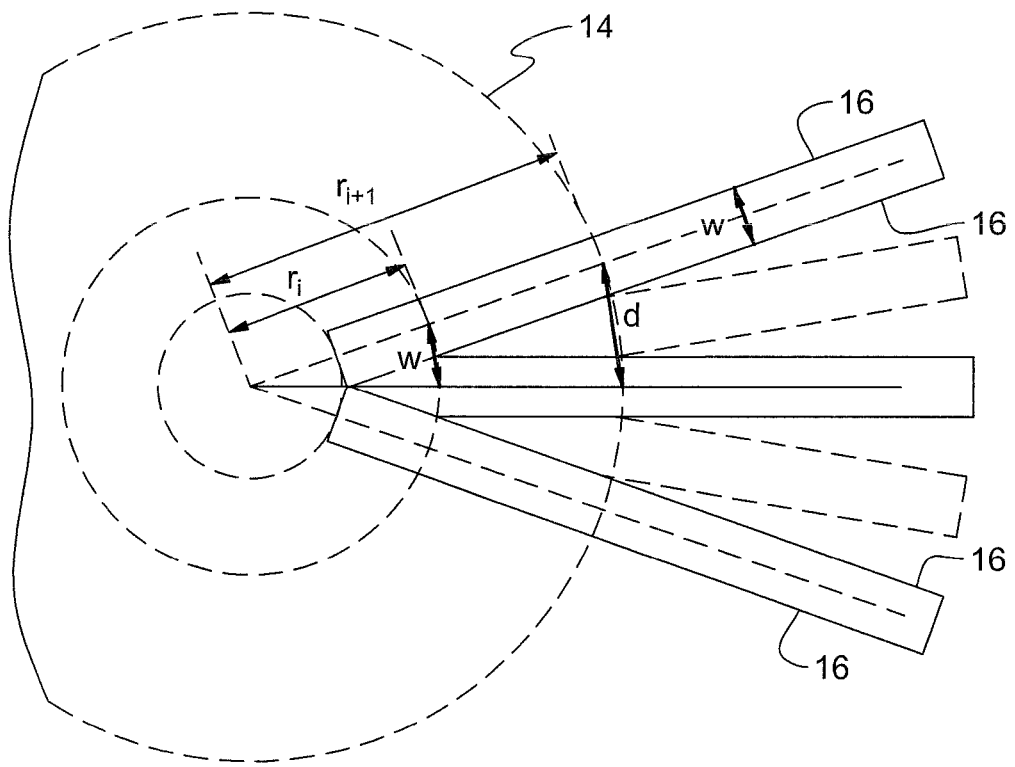
FIG. 4 illustrates, similar to FIG. 3, diagrammatically a relationship between a radii of consecutive rings utilized in the structure of FIG. 1.

Let ri and ri+1 be the radii of consecutive rings. From FIG. 4, one can approximate the distance between two pins at ring i as w. Therefore:

$$ri/w = ri+1/d \quad (2)$$

Combining relations (1) and (2), there is obtained:

$$ri = \tfrac{1}{2} ri+1 \quad (3)$$

Using relation (3), it is ascertainable that progressing towards the center of the cylinder, the radius of each successive ring is half that of the previous ring. This property can be used to calculate the size and number of the rings. It can be noted that this property is independent of the number of pins at each ring. It is also independent of the resolution and of the size of the pins, which means that the device can be built to any scale.

Employing this relationship to build a virtual haptic world, assumed is a maximum reach of a user of 96 cm (i.e. the radius of the outermost ring is therefore 96 cm), which roughly corresponds to the distance a large adult can reach with one arm stretched out. Assuming further that there is no need to add any ring whose radius would be smaller than 12 cm, since there is a need to account for the size of the user's body at the center of the cylinder. Under these assumptions obtained are four rings, whose respective radii are:

r1=12 cm
r2=24 cm
r3=48 cm
r4=96 cm

The number of pins per ring can be estimated by making assumptions on the desired resolution of the virtual world. The number of pins on ring i is given by:

$$ni = ri \times 2 \times PI / d$$

Assuming a resolution of 6 mm (i.e. d=6 mm) and approximating 2×PI by 6, obtained is the following number of pins per ring:

n1=120
n2=240
n3=480
n4=960

The total number of pins is the number of pins on the outermost ring (since the pins of the inner rings are subsets). This number represents the number of pins at each cross section in the cylinder. By specifying the resolution vertically (i.e. the distance between planes of pins), we can estimate the total number of pins arranged on the entire virtual wall.

Using the same resolution horizontally and vertically (i.e. 6 mm) and assuming a height of the cylinder of 1.8 m, one needs 300 planes of pins, and since there are 960 pins on each plane, the total number of pins in this case is 288,000 pins.

Note that these numbers are obtained using assumptions on resolution and size of wall. Other numbers, smaller or larger, would be obtained with other assumptions, using the relations (1), (2), (3), and (4) listed herein above.

Furthermore, provisions must be made to be able to protect the user while located within the confines of the cylindrical chamber 12. In order to protect the user, there can be set a maximum extension for the pins. In the calculations above, the smallest radius has been set to 12 cm, but depending upon the application, various options can be considered. The smallest radius can be set such that the pins 16 never touch the body of the user 10, in which case the user experiences the virtual world only through his/her extended arms and legs. This is appropriate for applications such as touching furniture in a showroom. The lowest limit is when the diameter of the cylinder of fully-extended pins can be set to zero, providing no safety; whereby this would be appropriate for applications where the user wants to dance cheek-to-cheek with an avatar.

The sensitivity of the pins could be set such that the pins will retract if the resistance they encounter when extending exceeds a threshold, in that this can be achieved by tuning a control mechanism.

Figure 5:
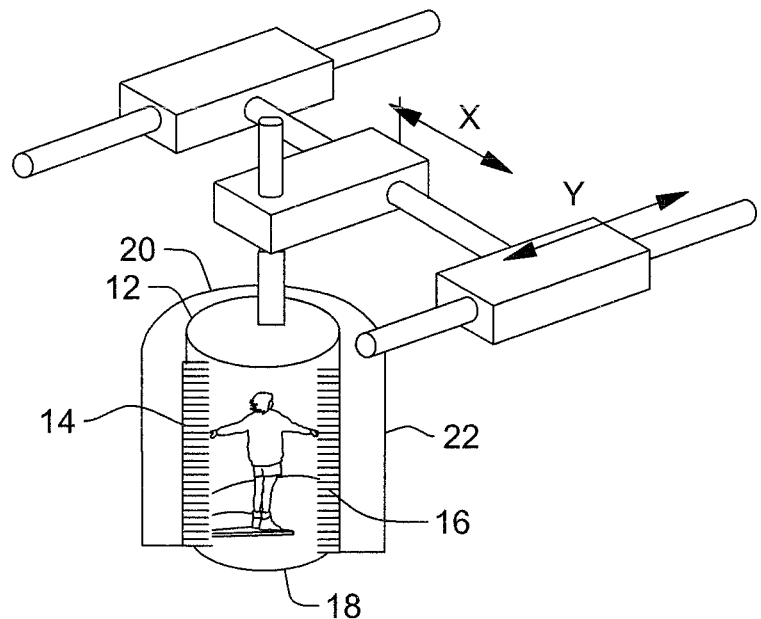
FIG. 5 illustrates, generally schematically, a perspective representation of an actuating arrangement for the structure of FIG. 1, incorporating robot arms or gantry devices.

Provisions can also be made for arranging the position of the cylinder, as represented in FIG. 5, and also objects may be represented in a moving cylindrical virtual world.

As shown in FIG. 5, the position of the entire cylinder and casing can be moved by a large robot arm or gantry system 30. This will allow the user 10 to move in the virtual world and walk to any objects present in the virtual distance that he/she wants to touch. The size of this displacement is limited only by practical, not fundamental, limitations. The cylinder movement is responsive such that movement of a user is immediately reflected in a cylinder movement. In order to implement this, the position of the person in the space is tracked by a head-mounted sensor (not shown in FIG. 5). As this position changes, the cylinder moving system 30 (a large-sized robot arm or gantry) displaces the cylinder horizontally so that the center of the cylinder aligns with the user's head.

Representing Objects in a Moving Cylindrical Virtual World

A computer system contains a calculation of the geometry of the extended virtual space. At any one position of the cylinder 12, the computer system creates a pattern of pin extensions that represent the geometry of the virtual object within the cylinder at that position. That representation is displayed on the radial set of pins, representing the virtual object(s) from the perspective of the user. The extension of the pins is calculated in such a manner that a beam is cast from the center of the cylinder to each corresponding pin position, and the extension is determined by the first intersection of that beam with the surface of the virtual object. As a consequence, the user perceives the extension of pins as representing the shape of a real object, from his/her viewpoint, and that in this way, the user can touch any pin-constructed object within his/her line of sight.

Figure 6:
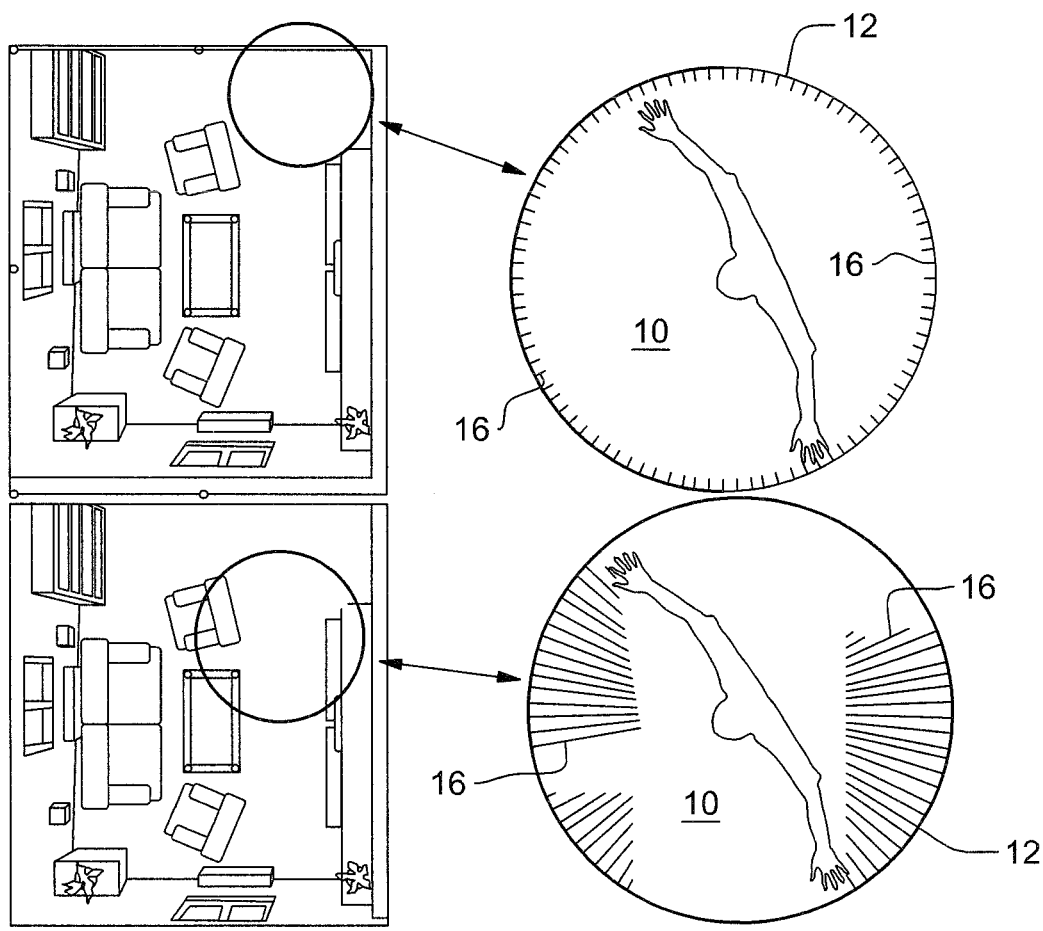
FIG. 6 illustrates an aspect of the virtual world, representative of furniture arrangements.

FIG. 6 shows two different positions of the cylinder in the virtual world, which in this case represents a room containing items of furniture. For each position, the drawing on the right shows the corresponding pin positions in the cylinder, corresponding to the objects encountered in the virtual world. In the top set of the drawings, the cylinder is positioned such that no objects intersect. In the bottom image, the user has moved to a position where the cylinder intersects with the objects in the virtual world. The pins' extension is calculated as described hereinabove, whereby it can be noticed that the shape of the extended pins reflects the shape of the objects that are encountered. Notice also that the person in the room is not in exactly the same position in the two images, reflecting the fact that the user 10 is free to move about within the cylinder, touching whatever the user chooses.

From the foregoing, it becomes readily apparent that, as described and shown in the drawings, the present invention clearly expands upon the abilities of providing haptile tactical virtual worlds or environments and enhances the novelty and abilities of the previously filed co-pending U.S. patent applications, while concurrently distinguishing over any art known in this particular technology.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but to fall within the spirit and scope of the appended claims.

What is claimed is:

1. A method of producing an interactive 3-D interface facilitating a user to implement actual physical applications so as to simulate real 3-D environments or a tactile virtual world in a haptic device, said method comprising:
providing, in communication with a computer device forming said simulated 3-D environment, a haptic device including an enclosure having interior surface structures mounting arrays of pins;
positioning the user in said enclosure having said interior surface structure representing a virtual environment or tactile virtual world;
receiving computer controlled signals at said enclosure for displacing pins of said arrays of pins to physically represent objects and corresponding surfaces of said simulated 3-D environment in said enclosure, said pins of each array being displaceable towards said user such that the tips of said pins are touchable by said user providing an experience of touching, feeling, and sensing objects and surfaces in said virtual environment in response to force applied to the user upon touching said pin tips; and
manipulating, by a user in said enclosure, said array of pins, so as to change and enter new or modified shapes of said physical representation of objects and corresponding surfaces of said 3-D environment, said computer device controlling and maintaining an overall representation of the new or modified surface and concurrently enforce any pre-established constraints by communicating properties of the physical 3-D object to the user through pin displacements,
wherein said enclosure comprises a cylindrical chamber for housing said user, said array of pins being mounted for radial reciprocal movements at peripheral side walls of said cylindrical chamber so as to enable said user to touch the radially inwardly extended tips of pins of said array of pins, said peripheral side wall comprising tiers of pins, each tier having a plurality of interdigitated pins of different maximum extensions, said interdigitated pins of different maximum extensions extending to provide an equivalent spatial resolution of an object independent of the distance of the object from the user.

2. The method as claimed in claim 1, wherein said surface structure comprises an array of pins mounted on a base for supporting the user within said enclosure.

3. The method as claimed in claim 2, wherein said array of pins are upwardly reciprocable for contact with the foot region of said user.

4. The method as claimed in claim 1, wherein said enclosure comprises at least one planar surface structure mounting an array of extendable pins for contact with a user.

5. The method as claimed in claim 1, wherein said cylindrical chamber is movable in response to actuation of a robotic arrangement to facilitate the user moving in the virtual world.

6. The method as claimed in claim 1, wherein a gantry arrangement is adapted to impart movement to said cylindrical chamber to facilitate the user moving in the virtual world.

7. The method as claimed in claim 1, wherein said interactive 3-D interface is adapted to generate scenarios in a virtual environment including: virtual shopping, virtual message avatar, virtual pottery and furnishings, virtual maps, virtual sports, tactile skill learning, training aids, interacting with computer generated data, and touching, feeling, editing and shaping objects, textures and surfaces.

8. A system for producing an interactive 3-D interface facilitating a user to implement actual physical applications so as to simulate real 3-D environments or a tactile virtual world in a haptic device, said system comprising:
a computer device in communication with a haptic device for forming a simulated 3-D environment in said haptic device, said haptic device including an enclosure having interior surface structures mounting arrays of pins;
a user positioned within said enclosure having said interior surface structure representing a virtual environment or tactile virtual world, said enclosure receiving computer controlled signals from said computer device at for displacing pins of said arrays of pins to physically represent objects and corresponding surfaces of said simulated 3-D environment in said enclosure, said pins of each array being displaceable towards said user such that (1) the tips of said pins are touchable by said user providing an experience of touching, feeling and sensing objects and surfaces in said virtual environment response to force applied to the user upon touching said pin tips;
a user in said enclosure manipulating said array of pins so as to change and enter new or modified shapes of said physical representation of objects and corresponding surfaces of said 3-D environment, said computer device controlling and maintaining an overall representation of the new or modified surface and concurrently enforce any pre-established constraints by communicating properties of the physical 3-D object to the user through pin displacements wherein said enclosure comprises a cylindrical chamber for housing said user, said array of pins being mounted for radial reciprocal movements in the peripheral side wall of said cylindrical chamber so as to enable said user to touch the radially inwardly extended tip of pins of said array of pins; and said peripheral side wall comprising tiers of pins, each tier having a plurality of interdigitated pins of different maximum extensions, said interdigitated pins of different maximum extensions extending to provide an equivalent spatial resolution of an object independent of the distance of the object from the user.

9. The system as claimed in claim 8, wherein said surface structure comprises an array of pins mounted on a base for supporting the user within said enclosure.

10. The system as claimed in claim 9, wherein said array of pins are upwardly reciprocable for contact with the foot region of said user.

11. The system as claimed in claim 8, wherein said enclosure comprises at least one planar surface structure mounting an array of extendable pins for contact with a user.

12. The system as claimed in claim 8, wherein said cylindrical chamber is movable in response to actuation of a robotic arrangement to facilitate the user moving in the virtual world.

13. The system as claimed in claim 8, wherein a gantry arrangement is adapted to impart movement to said cylindrical chamber to facilitate the user moving in the virtual world.

14. The system as claimed in claim 8, wherein said interactive 3-D interface is adapted to generate scenarios in a virtual environment including: virtual shopping, virtual message avatar, virtual pottery and furnishings, virtual maps, virtual sports, tactile skill learning, training aids, interacting with computer generated data, and touching, feeling, editing and shaping objects, textures and surfaces.

\* \* \* \* \*